United States Patent [19]

Tomoyori et al.

[11] Patent Number: 4,785,317

[45] Date of Patent: Nov. 15, 1988

[54] DOUBLE-SIDE PRINTER

[75] Inventors: Makoto Tomoyori, Iwate; Sunao Hatanaka, Takizawa; Keiichi Akiyama, Tamayama, all of Japan

[73] Assignee: Alps Electric Co., Ltd., Japan

[21] Appl. No.: 98,845

[22] Filed: Sep. 21, 1987

[30] Foreign Application Priority Data

Dec. 1, 1986 [JP] Japan ................................ 61-284183

[51] Int. Cl.[4] ........................................... G01D 16/00

[52] U.S. Cl. ................................ 346/150; 346/160.1; 355/24

[58] Field of Search ..................... 346/150, 153.1, 155, 346/160.1; 400/119, 188; 355/23, 24; 430/49; 101/DIG. 13, DIG. 5; 358/300, 302, 301

[56] References Cited

U.S. PATENT DOCUMENTS

| | | | |
|---|---|---|---|
| 4,585,336 | 4/1986 | Tanaka | 355/24 |
| 4,636,449 | 1/1987 | Gorondy | 400/49 |
| 4,637,709 | 1/1987 | Shirai | 355/24 |

*Primary Examiner*—Arthur G. Evans
*Attorney, Agent, or Firm*—Guy W. Shoup; Paul J. Winters

[57] ABSTRACT

A double-side printer having a printer body including a print head disposed oppositely to a platen, a sheet conveying unit mounted in the printer body and including a sheet supplying unit for sequentially supplying sheets stacked on a sheet supply tray one by one to a printing position between the print head of the printer body and the platen, and a sheet exhausting unit for stacking and exhausting the sheet from the printing position to an exhausted sheet tray comprising belt-like latent image forming means narrower than the width of the sheet, a pair of transferring units for transferring toner image formed on the latent image forming means reversely to one another to the sheet, and an electrophotographic processing unit having a pair of sheet passages for inserting the sheet to pass the sheet through the transferring units, arranged between the sheet supplying unit and the sheet exhausting unit of the sheet conveying unit, a fixing unit disposed out of the electrostatic processing unit for fixing the toner images on the sheet on the surfaces of the sheet, and passage switching means disposed in the sheet supplying unit for arriving the sheet of the sheet supplying unit at the fixing unit by selectively passing either one sheet passage of the developing unit, thereby enabling the double-side printer to double-side print in a simple structure to be inexpensively manufactured.

5 Claims, 3 Drawing Sheets

DOUBLE-SIDE PRINTER

BACKGROUND OF THE INVENTION

1. Field of the Invention

This invention relates to a printer and, more particularly, to a double-side printer associated with an electrophotographic processing unit for forming a toner image in an ordinary impact type print head for nonimpact printing the image and for further double-side printing.

2. Description of the Prior Art

In a conventional printer for double-side printing as described above, a one-side printed sheet has been heretofore guided into a reversing passage or switched back to be overturned upside down. A number of conventional printers have employed wire dot printers or thermal printers of impact type which could have simply multiprinted.

However, since a structure that the sheet is switched back and reversed upside down to double-side print the sheet as described above is complicated expensively and the impact type printer does not considerably improve the resolution of an image, this type has such drawbacks that the printing of a complicated drawing is improper and takes a long printing time when the number of prints is huge.

SUMMARY OF THE INVENTION

Accordingly, an object of this invention is to provide a double-side printer having both an impact type and a nonimpact type such as an electrophotographic type to overcome the above-mentioned drawbacks, and capable of double-side printing in a simple structure.

In order to achieve the above and other objects of the invention, there is provided a double-side printer having a printer body including a print head disposed oppositely to a platen, a sheet conveying unit mounted in the printer body and including a sheet supplying unit for sequentially supplying sheets stacked on a sheet supply tray one by one to a printing position between the print head of the printer body and the platen, and a sheet exhausting unit for stacking and exhausting the sheet from the printing position to an exhausted sheet tray comprising belt-like latent image forming means narrower than the width of the sheet, a pair of transferring units for transferring toner images formed on the latent image forming means reversely to one another to the sheet, and an electrophotographic processing unit having a pair of sheet passages for inserting the sheet to pass the sheet through the transferring units, arranged between the sheet supplying unit and the sheet exhausting unit of the sheet conveying unit, a fixing unit disposed out of the electrostatic processing unit for fixing the toner images on the sheet on the surfaces of the sheet, and passage switching means disposed in the sheet supplying unit for arriving the sheet of the sheet supplying unit at the fixing unit by selectively passing either one sheet passage of the developing unit.

According to the present invention, the double-side printer can both impact-print in case of multiprinting and nonimpact print in case of printing a complicated drawing or the like, and can further double-side print by feeding the sheet printed on one side surface by feeding the sheet to one sheet passage of the developing unit to the other sheet passage of the developing unit without overturning to print on the other side of the sheet.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of a double-side printer according to the present invention will be described in detail with reference to the accompanying drawings.

Figure 1:
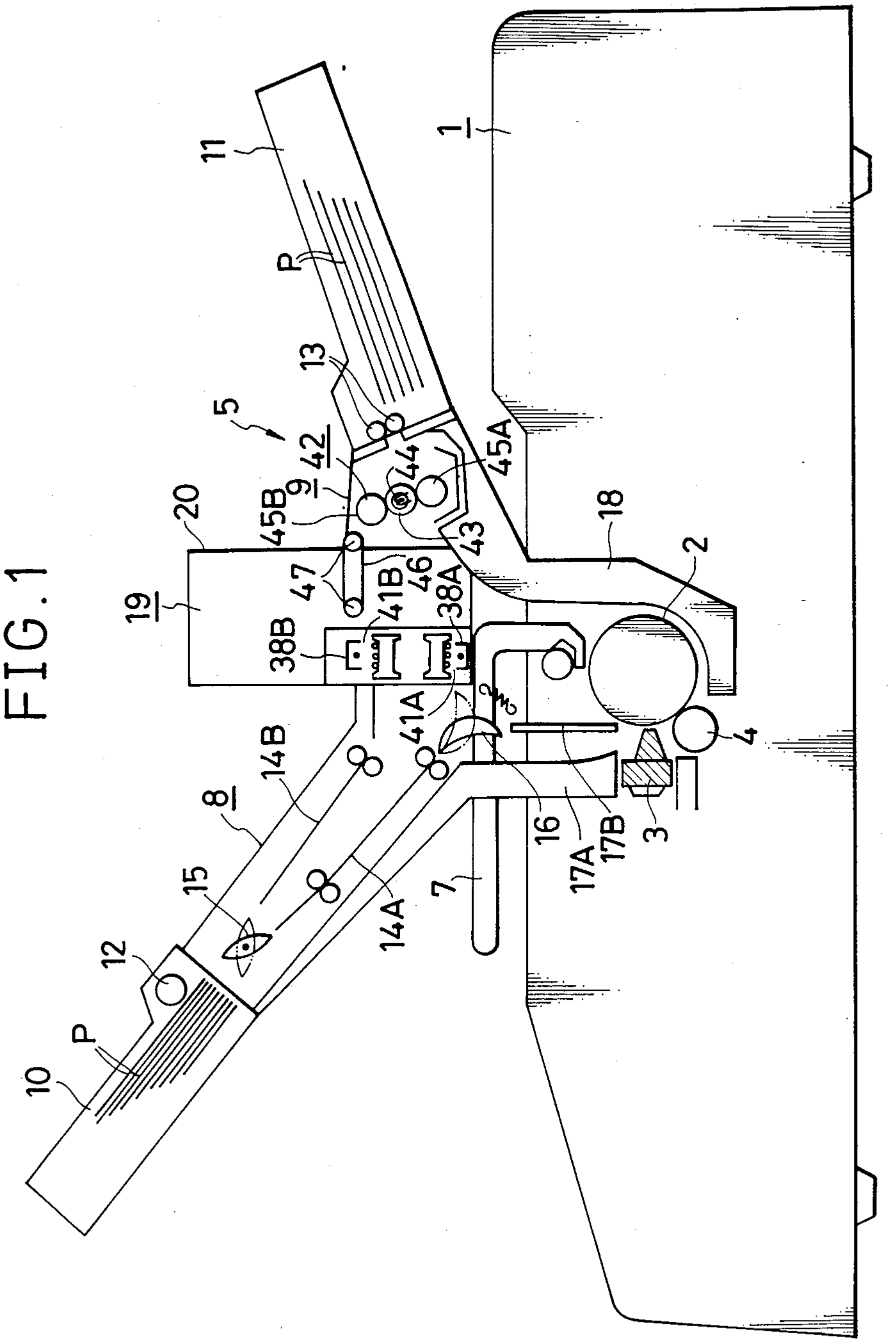
FIG. 1 is a partial longitudinal sectional front view showing an embodiment of a double-side printer according to the present invention.

FIG. 1 shows the entirety of a first embodiment of a double-side printer according to the invention. In a printer body 1 are arranged a platen 2, a wire dot opposed to the platen 2, and a print head 3 such as a thermal head. A single-slip type sheet P disposed at a printing position between the platen 2 and the print head 3 is sequentially conveyed by a conveying roller 4 pressed on the platen 2.

A sheet conveying unit 5 disposed on the printer body 1 is mounted by an L-shaped stationary member 9 engaged with a supporting shaft 6 disposed in the printer body 1 to be urged by a spring in the printed body 1. The sheet conveying unit 5 has a sheet supplying unit 8 and a sheet exhausting unit 9 disposed obliquely so that the platen 2 sides of the units 8 and 9 are disposed at the lower positions, a sheet supply tray 10 is formed at the upper end of the sheet supplying unit 8, and an exhausted sheet tray 11 is formed at the upper end of the sheet exhausting unit 9. A sheet feeding roller 12 is disposed in the sheet supply tray 10 to sequentially feed sheets P stacked in the tray 10 one by one by the roller 12. A pair of conveying rollers 13 and 13 contacting under pressure with one another to be reversibly rotatable are disposed in the exhausted sheet tray 11 to drive to feed the sheets P into the tray 11 or out of the tray 11.

A pair of upper and lower sheet passages 14B and 14A for conveying the sheet P fed from the sheet supply tray 10 are formed at an elevational interval in the sheet supplying unit 8, and other conveying rollers 13, 13 are disposed in the sheet passages 14B and 14A. A switching pawl 15 for selecting the sheet passages 14B and 14B are rotatably disposed in the in the sheet supplying unit 8 in front of the sheet supply tray 10. Another switching pawl 16 is rotatably disposed at the lower end of the sheet supplying unit 8 to selectively convey the sheet P fed to the sheet passage 14A or supply the sheet P between the platen 2 and the print head 3 in the printer body 1. A guide members 17A and 17B for feeding the sheet P in the sheet supplying unit 8 between the platen 2 and the print head 3 are vertically hung under the switching pawl 16 in the sheet conveying unit 5. A guide member 18 for feeding the sheet P passed between the platen 2 and the print head 3 to the sheet exhausting unit 9 is vertically hung in the sheet conveying unit 5.

Figure 2:
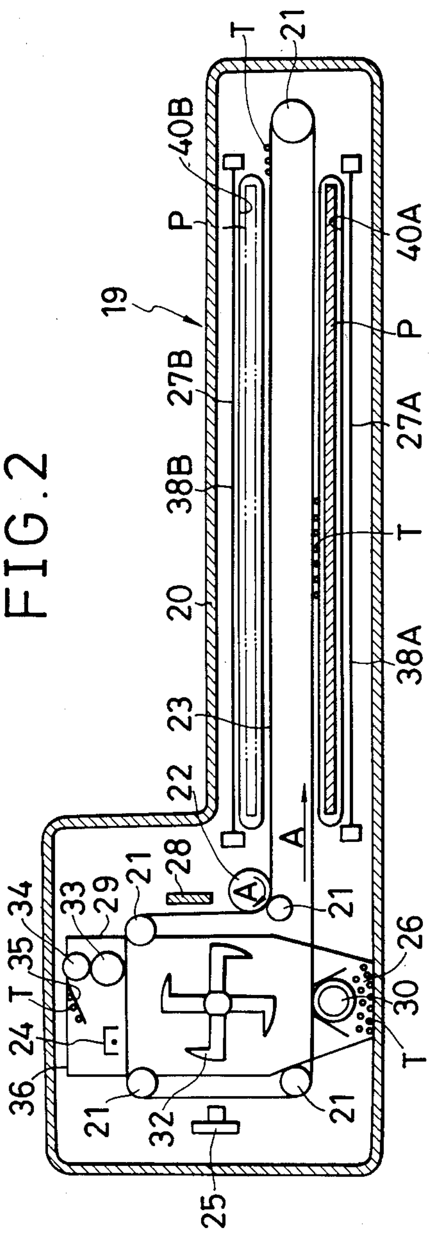
FIG. 2 is an enlarged longitudinal sectional view of an electrophotographic processing unit of FIG. 1.
Figure 3:
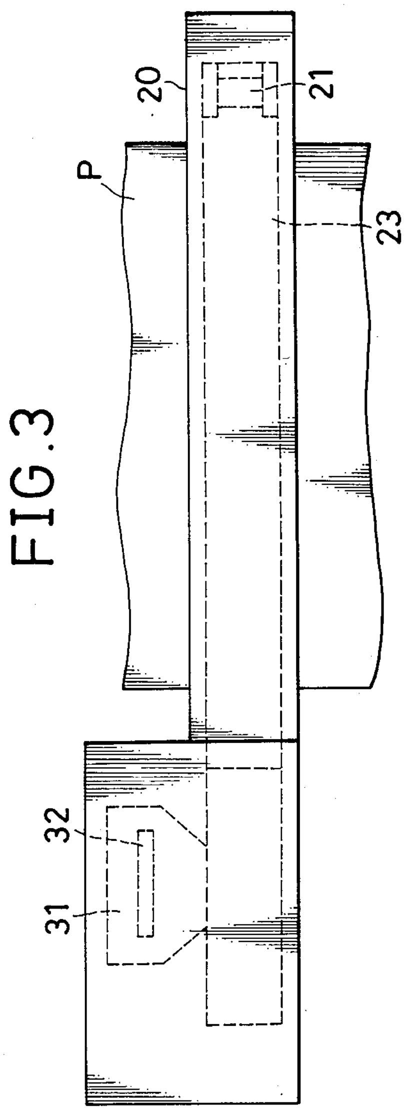
FIGS. 3 and 4 are plan and front views of FIG. 2.

An electrophotographic processing unit 19 is disposed as an example of a developing unit between the sheet supplying unit 8 and the sheet exhausting unit 9 of the sheet conveying unit 5. As shown in FIG. 2, the electrophotographic processing unit 19 has a synthetic resin casing 20, in which various units necessary to process an electrophotograph except a fixing unit are contained. In other words, an endless OPC belt 23 driven in a direction of an arrow A by a driving roller 22 is supported at both lateral ends (non-writing portions) to a plurality of guide rollers 21, 21, . . . , and disposed in the casing 20. The OPC belt 23 has a width capable of forming an image substantially corresponding to one line. In the casing 20 outside the OPC belt 23 are arranged a charging unit 24 for uniformly charting the OPC belt 23, an LED head for writing an electrostatic latent image according to a printing pattern supplied from a controller, not shown, to the OPC belt 23 uniformly charged by the charging unit 24, a developing unit 26 for developing the latent image formed on the OPC belt 23 by adhering toner T to the image, first and second transferring units 27A and 27B for transferring the toner image on the OPC belt 23 to the sheet P, an electrostatic eliminator 28 for removing the remaining potential on the OPC belt 23, and a cleaner 29 for removing the remaining toner T on the OPC belt 23 in the direction of the arrow.

Figure 4:
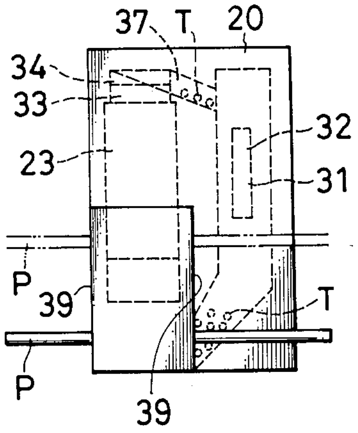

The LED head 25 has a plurality of light emitting units disposed in a direction perpendicular to the feeding direction of the OPC belt 23. The developing unit 26 has a developing roller 30 for adhering toner T disposed in a bottom to the OPC belt 23 disposed above the toner T. As shown in FIG. 4, the developing unit 26 supplies the toner T from a hopper 31 disposed behind the OPC belt 23, and has an agitator 32 disposed in the hopper 31. The cleaner 29 has a sponge roll 33 contacted with the OPC belt 23, a magnet roll 34 for attracting the toner T adhered to the sponge roll 33, and a plate 35 for separating the toner T attracted to the magnet roll 34. The toner T separated by the plate 35 is dropped to the hopper 31 through an oblique passage 37 for communicating between the casing 36 of the cleaner 29 and the hopper 31 and agitated with new toner T by the agitator 32.

The first transferring unit 27A is provided to adhere the toner image on the upper surface of the sheet P, and has a transferring unit 38A disposed under the OPC belt 23. A sheet passage 41A to which the sheet P is inserted through lateral oblong slits 40A, 40A formed at both sidewalls 39 and 39 of the casing 20 is formed between the transferring unit 38A and the OPC belt 23. The second transferring unit 27B is provided to adhere the toner image on the lower surface of the sheet P, and has a transferring unit 38B disposed above the OPC belt 23. Thus, a sheet passage 41B to which the sheet P is inserted through slits 40B, 40B formed at both outsides 39, 39 of the casing 20 between the transferring unit 38B and the OPC belt 23. The sheet passage 41A is disposed on the extension line of the sheet passage 14A, and the sheet passage 41B is disposed on the extension line of the sheet passage 14B.

Figure 5:
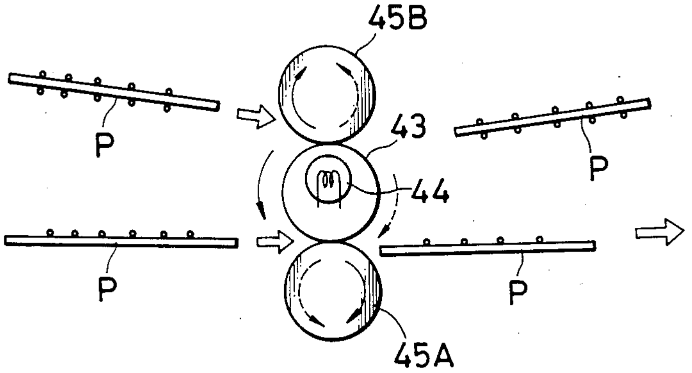
FIG. 5 is a detailed view of a fixing unit.

Referring back to FIG. 1, a fixing unit 42 for fixing the toner T on the sheet P exhausted from the electrophotographic processing unit 19 on the surface of the sheet P is disposed in the sheet exhausting unit 9. As shown in detail in FIG. 5, the fixing unit 42 has a heating roll 43 having a heat source 44 to be heated, a pressure roll 45A for pressing the heating roll 43 in contact from below and a pressure roll 45B for pressing the heating roll 43 in contact from above. The sheet P fed out of the slit 40A of the electrophotographic processing unit 19 is interposed between the heating roll 43 and the pressure roll 45A to be fixed by the toner T on the upper surface of the sheet P by the heat and the mechanical pressure, and the sheet P fed out of the slit 40B of the electrophotographic processing unit 19 is interposed between the heating roll 43 and the pressure roll 45B to be fixed by the toner T on the lower surface of the sheet P similarly. The rolls 43, 45A, 45B are so selected at the positions and in size so that the sheet P which has passed from the left to the right of FIG. 1 between the heating roll 43A and the pressure roll 45A, and between the heating roll 45 and the pressure roll 45B can arrive at between the conveying rollers 13 and 13 of the exhausted sheet tray 11. Marks "o" indicate unfixed toner, and solid marks "o" denote fixed toner in FIG. 5.

A belt 46 is wound between a pair of pulleys 47 and 47 to feed the sheet P fed from the slit 40B of the electrophotographic processing unit 19 between the heating roll 43 and the pressure roll 45B above the sheet exhausting unit 9 between the electrophotographic processing unit 19 and the fixing unit 42. The belt 45 has a number of pores (not shown) formed thereat to attract the sheet P to the belt 46 by attracting means disposed inside the belt 46 for conveying the sheet P.

The operation of the double-side printer of this embodiment will be described.

When the sheet P is first printed by the print head 3 in the printer body 1, the switching pawl 15 is disposed at the position designated by solid lines in FIG. 1 to be able to feed the sheet P from the sheet supply tray 10 to the lower sheet passage 14A, the switching pawl 16 is similarly disposed at the position designated by solid lines in FIG. 1 to feed the sheet P from the sheet passage 14A into the printer body 1, the sheet feeding roller 12 is rotatably driven to feed the sheet P in the sheet supply tray 10 into the sheet passage 14A, the sheet P is disposed at the printing position between the platen 2 and the print head 3 in the printer body 1 by driving with the conveying rollers 13, 13 in the sheet passage 14A, and printed as required by repeating the printing by the print head 3 and the intermittent conveying of the sheet P. After the printing is finished, the sheet P is passed, though not required, between the heating roll 43 and the pressure roll 45A of the fixing unit 42 and is then exhausted to the exhausted sheet tray 11.

When one side of the sheet P is printed by a toner image, the switching pawl 15 is disposed at the position designated by solid lines in FIG. 1 similarly to the case of printing with the print head 3 as described above, the switching pawl 16 is disposed at a position designated by broken lines in FIG. 1 to be able to feed the sheet P from the sheet passage 14A to the slit 40A of the electrophotographic processing unit 19, the sheet feeding roller 12 is rotatably driven to feed the sheet P in the sheet supply tray 10 into the sheet passage 14A, is further inserted by the rotations of the conveying rollers 13, 13 through the slit 40A of the electrophotographic processing unit 19 to the electrophotographic processing unit 19, and the sheet P is stopped by a stopper, not shown, when a predetermined printing position of the sheet P is opposed to the OPC belt 23 in the casing 20. In this state, the OPC belt 23 of the electrophotographic processing unit 19 is fed in a direction of an arrow A, is charged by the charging unit 24, and an electrostatic latent image is written according to the printing patter supplied from the controller by the LED head 25 to the charged charging unit 24. Then, toner is adhered to the electrostatic latent image by the developing unit 26 to form a toner image of one lie on the OPC belt 23. When the OPC belt 23 of the position formed with the toner image arrives at the first transferring unit 27A, the transferring unit 38A is energized to transfer the toner image on the OPC belt 23 to hhe upper surface of the sheet P. The OPC belt 23 after transferring the toner T is removed at the remaining potential by the electrostatic eliminator 28, the remaining toner T is then removed by the cleaner 29, and the OPC belt 23 is then returned to the initial position. After the toner of one line is formed on the sheet P in this manner, the conveying rollers 13, 13 are driven to convey the sheet P by one line, and the toner image on the OPC belt 23 is again transferred to the upper surface of the sheet P by the means similarly as described above. When the printing of one line by the electrophotographic process and the intermittent conveying of the sheet P are repeated to continue the printing, the sheet P gradually approaches the fixing unit 42, and is eventually interposed between the heating roll 43 and the pressure roll 45A rotating in a direction of the arrow with the solid line of the fixing unit 42, and the toner T on the upper surface of the sheet P is fixed by the intermittent conveying of the sheet P one line by one line by the heat and the mechanical pressure of the rolls 43, 45A. The intermittent conveying of the sheet P is continued until printing of the sheet P by the electrophotographic processing unit 19 is finished, the heating roll 43 and the pressure roll 45A are continuously rotated after the printing is finished, and the printed sheet P is exhausted to the exhausted sheet tray 11 as the rotations of the conveying rollers 13, 13 of the tray 11.

When double-side printing with toner image is further executed, the sheet P in the sheet supply tray 10 is fed to the sheet passage 14A similarly to the one side printing of the toner image described above, the toner image is transferred to the upper surface of the sheet P by the electrophotographic processing unit 19, the sheet P is arrived at the rear end at between the heating roll 43 and the pressure roll of the fixing unit 42 and the toner T is fixed. Then, the rear end of the sheet P is detected by a sensor, not shown, to reversely rotate the rolls 43, 45A, the conveying rollers 13, 13 and the sheet feeding roller 12 by a signal from the sensor. As a result, the sheet P which has arrived at a part at the sheet supply tray 11 is conveyed from the right leftward in FIG. 1, and returned through the electrophotographic processing unit 19, the sheet passage 14A into the sheet supply tray 10. After the sheet P has been completely contained in the sheet supply tray 10 in this manner, the switching pawl 15 is switched to the position designated by an imaginary broken line in FIG. 1 to feed the sheet P from the sheet supply tray 10 to the upper sheet passage 14B. Then, the sheet feeding roller 12 is rotatably driven forwardly to throw the sheet P printed on the upper surface in the sheet supply tray 10 in the sheet passage 14B, the sheet P is further inserted by the forward rotations of the conveying rollers 13, 13 through the slit 40B of the electrophotographic processing unit 19 to the electrophotographic processing unit 19, and the sheet P is printed for one line on the lower surface by the second transferring unit 27B by the similar electrophotographic process to the case of the one side printing described above on the sheet P stopped at a predetermined position. The sheet P is then intermittently conveyed by one line, and is printed for next line. When the printing of one line and the intermittent conveying of the sheet P are repeated in this manner to continue the printing, the sheet P is conveyed rightward while being attracted to the belt 46 by the attracting means, is interposed between the heating roll 43 and the pressure roll 45B rotated in a direction of the arrow with a broken line of the fixing unit 42, and the toner T on the lower surface of the sheet P is fixed to the lower surface of the sheet P one line by one line by the intermittent conveying of the sheet P. When the lower surface of the sheet P is completely printed by the electrophotographic processing unit 19, the heating roll 43 and the conveying rollers 13, 13 of the exhausted sheet tray 11 are continuously rotated to exhaust the sheet P printed on both side surfaces to the exhausted sheet tray 11.

According to this embodiment as described above, both the impact printing by the print head 3 by feeding the sheet P into the printer body 1 and the nonimpact printing by the electrophotographic processing unit 19 by inserting the sheet P into the electrophotographic processing unit 19 can be performed. Therefore, the advantages of both the printings can be utilized. Since the double-side printing can be executed merely by passing the sheet P through the transferring units 27A, 27B of the electrophotographic processing unit 19, a reversing passage of complicated construction is not necessary. Even if the fixing unit 42 fixes the toner T on the sheets P from the two sheet passages 14A, 14B at separate positions, only one expensive heating roll 43 may be sufficient to be inexpensively manufactured.

In the embodiment described above, the developing unit has been employing the electrophotographic processing unit 19. However, the developing unit may employ to form a toner image by an electrostatic type or to form a toner image by a magnetic type. To form the toner image by the electrostatic type, a belt of latent image forming means becomes an electrostatic belt, and an electrostatic latent image is formed by multistylus electrode head on the electrostatic belt. To form the toner image by the magnetic type, a belt becomes a magnetic belt, and an electrostatic latent image is formed by a magnetic head on the magnetic belt.

This invention is not limited to the particular embodiment described above. Various other changes and modifications may be made within the spirit and scope of this invention.

According to the present invention as described above, both the impact printing and the nonimpact printing can be suitably selectively executed as required, and double-side printing can be simply executed to be inexpensive manufactured.

What is claimed is:

1. A double-side printer having a printer body including a print head disposed oppositely to a platen, a sheet conveying unit mounted in the printer body and including a sheet supplying unit for sequentially supplying sheets stacked on a sheet supply tray one by one to a printing position between the print head of the printer body and the platen, and a sheet exhausting unit for stacking and exhausting the sheet from the printing position to an exhausted sheet tray comprising belt-like latent image forming means narrower than the width of the sheet, a pair of transferring units for transferring toner images formed on the latent image forming means reversely to one another to the sheet, and an electrophotographic processing unit having a pair of sheet passages for inserting the sheet to pass the sheet through the transferring units, arranged between the sheet supplying unit and the sheet exhausting unit of the sheet conveying unit, a fixing unit disposed out of the electrostatic processing unit for fixing the toner images on the sheet on the surfaces of the sheet, and passage switching means disposed in the sheet supplying unit for arriving the sheet of the sheet supplying unit at the fixing unit by selectively passing either one sheet passage of the developing unit.

2. A double-side printing according to claim 1, wherein the latent image forming means of said electrophotographic processing unit is a photosensitive belt formed with a latent image by an optical writing head.

3. A double-side printing according to claim 1, wherein the latent image forming means of said electrophotographic processing unit is an electrostatic belt formed with a latent image by a multistylus electrode head.

4. A double-side printing according to claim 1, wherein the latent image forming means of said electrophotographic processing unit is a magnetic head formed a latent image by a magnetic head.

5. A double-side printing according to any of claims 1 to 4, wherein a pair of pressure rolls for pressing one heating roll are arranged in said fixing unit to selectively feed a sheet between the heating roll and the pressure rolls.

* * * * *